Aug. 18, 1936.  J. A. FISHLEIGH  2,051,694
AGRICULTURAL IMPLEMENT FOR CULTIVATING LAND
Filed Nov. 25, 1935  3 Sheets-Sheet 1

INVENTOR
JOHN A. FISHLEIGH
By Norris & Bateman
ATTORNEYS

Aug. 18, 1936.  J. A. FISHLEIGH  2,051,694
AGRICULTURAL IMPLEMENT FOR CULTIVATING LAND
Filed Nov. 25, 1935   3 Sheets-Sheet 2
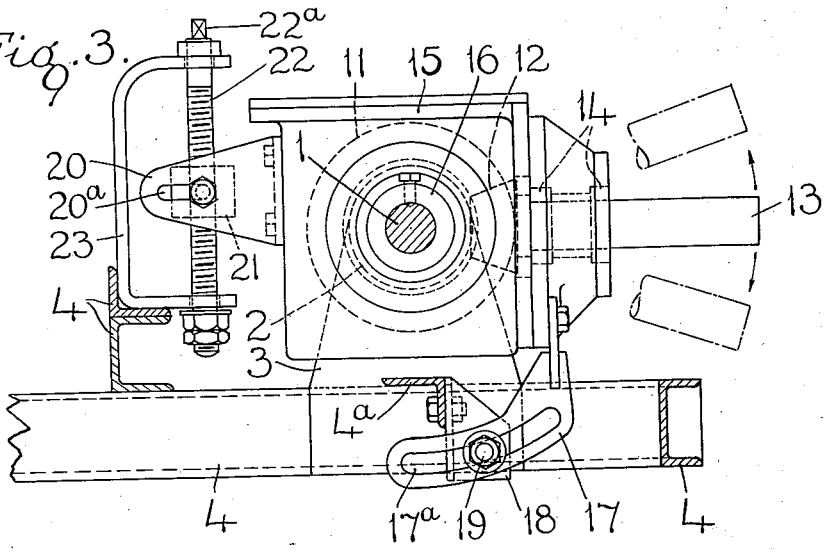
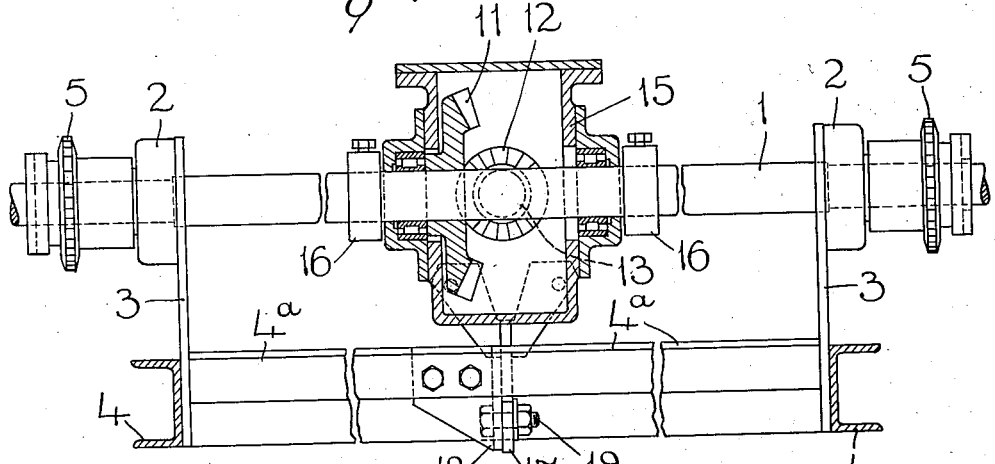
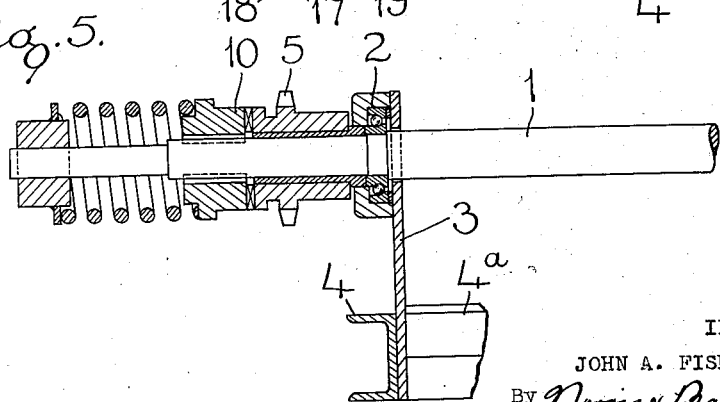
INVENTOR
JOHN A. FISHLEIGH
By Norris & Bateman
ATTORNEYS

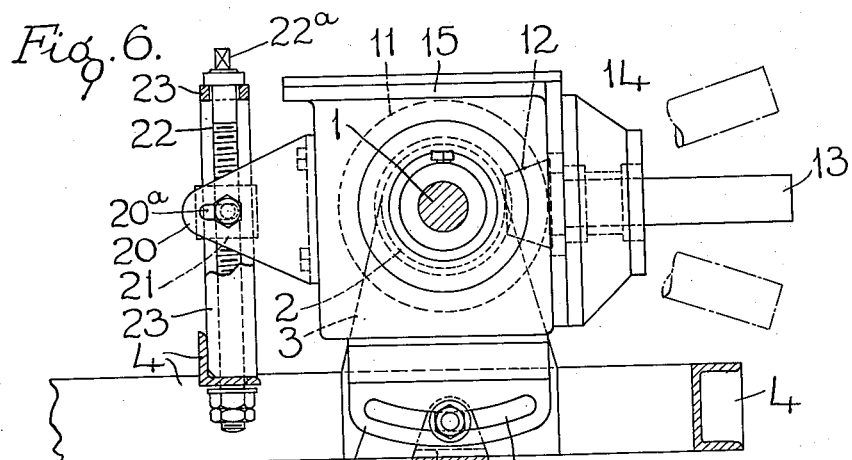
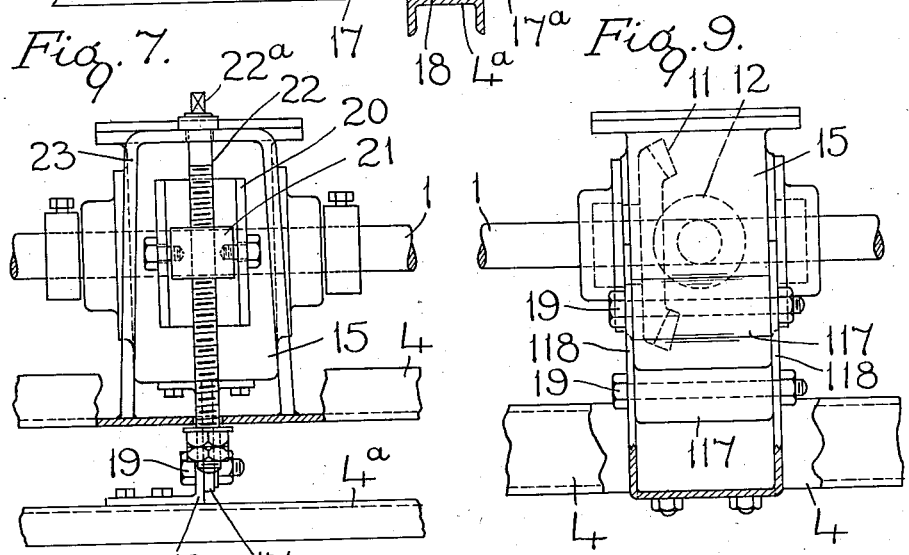
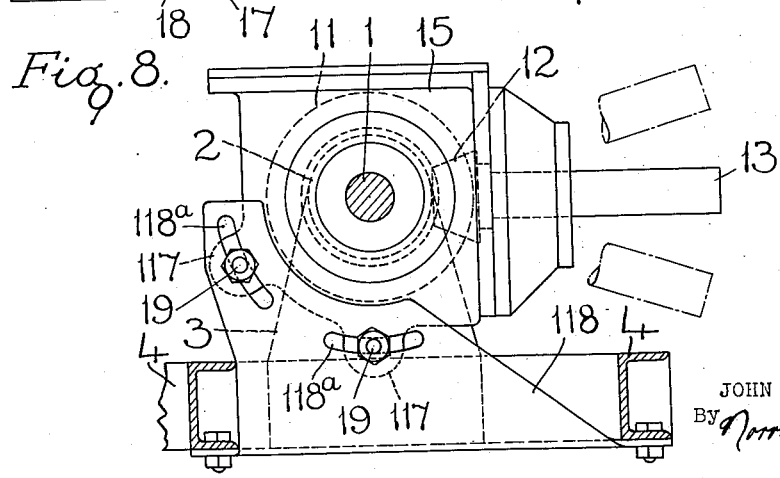

Patented Aug. 18, 1936

2,051,694

UNITED STATES PATENT OFFICE 2,051,694

AGRICULTURAL IMPLEMENT FOR CULTIVATING LAND

John Andrew Fishleigh, Buckland Brewer, Bideford, England

Application November 25, 1935, Serial No. 51,523
In Great Britain December 10, 1934

8 Claims. (Cl. 97—40)

This invention relates to that class of agricultural implement for cultivating land of the rotary cultivator or like type comprising a frame running on wheels and adjustable as to height on the wheels, the frame being provided with a revolving shaft carrying a series of tines or digging implements which act on the ground, the shaft being revolved through suitable mechanism from a tractor or the like at a speed greater than the speed of travel of the machine.

The object of this invention is to construct driving mechanism of the implement in an improved manner whereby it is adjustable to suit various types of prime movers, in which the drive shafts vary as to the height from the ground level, the adjustment allowing the correct angle of drive between the tractor driving shaft and the shaft to which it is coupled on the implement to be obtained.

The invention consists in providing a cross-shaft rotatably mounted in the machine and geared to the shaft carrying the tools, a member rotatably mounted on the cross-shaft, a drive shaft rotatably mounted in the member and having means for connection to the tractor drive, gear connecting the drive shaft with the cross-shaft, and means for locking the member against rotation, whereby the member and drive shaft can be angularly adjusted in relation to the cross-shaft to suit the heighth of the tractor drive and be locked in the adjusted position.

Means may also be provided for adjusting the member.

The invention will be clearly understood from the following description aided by the accompanying drawings in which three examples of carrying the invention into effect are illustrated, and in which:—

Figure 1 is a side view of a rotary cultivator such as is set forth in United States Patent No. 1,963,894, showing one construction of the invention applied.

Figure 2 is a rear view of the gear box and part of the shaft and frame of the machine.

Figure 3 is a side view of the gear box and part of the frame shown in Figure 1.

Figure 4 is a part sectional end view of Figure 2, and

Figure 5 is a sectional view of one end of the shaft and part of the frame.

Figure 6 is a side view, similar to Figure 2, but showing a modified construction of gear box.

Figure 7 is an end view of Figure 6.

Figure 8 is a similar view to Figure 2, but of a further modified construction of gear box, and Figure 9 is an end view of Figure 8.

As one example of carrying the invention into effect, and as shown in Figures 1 to 5 of the accompanying drawings, in the front of the implement is mounted a cross shaft 1 carried in bearings 2, 2 in the side members 3, 3 of the frame 4 of the implement. Such shaft 1 preferably at each end, as shown, carries a sprocket wheel 5, 5 connected by a chain drive 6 to a sprocket wheel 7 on the shaft 8 carrying the tines or digging implements 9, the cross shaft 1 being provided with clutch mechanism 10, such as a dog clutch, whereby the drive between the two shafts 1 and 8 can be temporarily disengaged.

At about central of the cross shaft 1 is fixedly mounted a bevel wheel 11, this bevel wheel 11 meshing with a bevel pinion 12 secured to a shaft 13 positioned at right angles to the cross shaft 1, the pinion shaft 13 being carried in bearings 14 of a gear box 15 which is rotatably mounted on the cross shaft 1 and held against end on movement by collars 16, 16 secured to shaft 1 on either side of the box 15. The pinion shaft 13 extends from the gear box 15 at the front where it is provided with means for connection to a coupling shaft provided with a universal joint which is in turn connected to the tractor driving shaft, means being provided on the gear box and frame whereby the box after adjustment to the radial position required can be securely held to the frame in that position, and such means may consist of a slotted quadrant bracket 17 on the gear box, and a bracket 18 on a cross bar 4ᵃ of the frame 4 provided with a nut and bolt 19, the slot 17ᵃ in the gear box quadrant bracket 17 allowing the gear box 15 angular adjustment, and on tightening the nut and bolt 19, the two brackets 17 and 18 will be securely held together.

Means are also preferably provided on the gear box 15 and frame 4 for the positive adjustment of its radial position, and may consist of a U-shaped bracket 20 on the end of the gear box 15 carrying a nut 21 loosely positioned in slots 20ᵃ in the bracket 20, and engageable by a vertically positioned screwed rod 22 carried in bearings of a bracket 23 secured to the frame 4, the screwed rod 22 being secured against end on movement and provided at its upper end with an extending square portion 22ᵃ to which a handle can be attached, so that when the screwed rod 22 is revolved, the nut 21 rides up or down the rod 22 to rock the gear box 15 on the cross shaft 1.

The clutches 10 are preferably so constructed that should the resistance to the tines 9 exceed a certain amount, the clutches 10 can slip and so obviate damage to the gear or tractor.

In the modification shown in Figures 6 and 7, the gear box 15 is provided with a plate 17 positioned on the underside of the gear box 15, such plate 17 having a curved slot 17ª working in conjunction with a bracket 18 secured to a member 4ª of the frame 4.

In this example, the bracket 23 is of inverted U shape and secured to a member of the frame 4, and the screwed rod 22 is carried between the U shaped bracket 23 and the member of the frame.

In the example shown in Figures 8 and 9, the adjusting means is dispensed with and the gear box 15 is provided with bosses 117 which extend outside the box 15. These bosses 117 have holes and fit between flanged plates 118 secured to the frame and having curved slots 118a. Bolts 19 are passed through the holes in the bosses 117 and slots 118a.

In practice, the bolts and nuts 19 are loosened, and the gear box 15 swivelled on the shaft 1 either by turning the screw-post 22 (Figures 1 to 7) or by hand (Figures 8 and 9) to position the pinion shaft 13 at the correct angle to suit the heighth of the tractor drive, and the bolts and nuts 19 are then tightened up to lock the gear box 15 in the adjusted position.

The gear box 15 can be adjusted through any angle to the maximum limit provided by the slots.

What I do claim as my invention and desire to secure by Letters Patent is:—

1. In agricultural implements for cultivating land employing rotary tools driven through mechanism from a separate prime mover, a cross-shaft rotatably mounted in the machine and geared to the shaft carrying the tools, a member rotatably mounted on the cross-shaft, a drive shaft rotatably mounted in the member and having means for connection to the power drive, gearing connecting the drive shaft with the cross-shaft, and means for locking the member against rotation, whereby the member and drive shaft can be angularly adjusted in relation to the cross-shaft to suit the heighth of the power drive and be locked in the adjusted position.

2. In agricultural implements as claimed in claim 1, means for adjusting the member and drive-shaft in relation to the cross-shaft.

3. In agricultural implements for cultivating land, employing rotary tools driven through mechanism from a tractor, a cross-shaft rotatably mounted in the machine and geared with the shaft carrying the tools, a crown or bevel wheel mounted on the cross-shaft, a frame or box rotatably mounted on the shaft and positioned about the crown wheel, a drive shaft rotatably mounted in the frame or box perpendicular to the cross-shaft and having a bevel pinion meshing with the crown wheel secured to one end, and means at the other end for connecting to the tractor drive, and means operable to lock the frame or box and drive shaft in an adjusted position.

4. In agricultural implements as claimed in claim 3, wherein the frame or box is provided with a bracket carrying a loosely mounted nut, and the machine is provided with a rotatably mounted screwed rod engaging in the nut, whereby on rotating the screwed rod, the frame or box can be angularly adjusted in relation to the cross-shaft.

5. In agricultural implements as set forth in claim 1, wherein the means for locking said member against rotation comprises a bracket secured to said member and having a slot therein concentric with the axis of said cross shaft, and a bolt mounted in fixed position in the machine and extending through said slot and operative to lock said member in different angularly adjusted positions about the axis of the cross shaft.

6. In agricultural implements as set forth in claim 1, a bracket fixed to said member and having a threaded nut mounted loosely therein, a U shaped bracket fixed on the frame of the machine, and a threaded rod rotatably mounted at its ends in said bracket and engaging said nut for angularly adjusting said member about the axis of the cross shaft.

7. In agricultural implements, as set forth in claim 1, a bracket fixed to said member and having a threaded nut mounted loosely therein, an inverted U shaped bracket having its ends fixed to the frame of the machine, and a threaded rod rotatably mounted at one end in the frame of the machine and at its other end in the intermediate portion of the bracket and engaging said nut for angularly adjusting said member about the axis of the cross shaft.

8. In agricultural implements as set forth in claim 1, wherein said member is provided with lugs, opposed plates fixed to the frame of the machine at opposite sides of said lugs and having segmental slots therein concentric with the axis of the cross shaft, and bolts carried by said lugs and extending through said slots for locking said member in different angular positions about the axis of the cross shaft.

JOHN ANDREW FISHLEIGH.